(12) United States Patent
Mizuishi et al.

(10) Patent No.: US 6,700,854 B1
(45) Date of Patent: Mar. 2, 2004

(54) OPTICAL STORAGE APPARATUS AND PHASE COMPENSATION AMOUNT ADJUSTMENT METHOD

(75) Inventors: Kazuyuki Mizuishi, Kawasaki (JP); Masahiko Kataoka, Kawasaki (JP); Hidenori Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/550,947

(22) Filed: Apr. 17, 2000

(30) Foreign Application Priority Data

Sep. 20, 1999 (JP) .............................. 11-265563

(51) Int. Cl.[7] .................................................. G11B 7/00
(52) U.S. Cl. .............................. 369/112.16; 369/112.17
(58) Field of Search ........................... 369/13.24, 13.29, 369/13.3, 13.31, 53.19, 53.3, 110.01, 110.04, 112.01, 112.05, 112.09, 112.16, 112.17, 112.19

(56) References Cited

U.S. PATENT DOCUMENTS

| | | | | |
|---|---|---|---|---|
| 4,429,378 A | * | 1/1984 | Sato ...................... | 369/112.21 |
| 4,823,220 A | * | 4/1989 | Milster et al. ............. | 369/13.3 |
| 5,561,655 A | * | 10/1996 | Gage et al. ............. | 369/124.12 |
| 5,657,305 A | * | 8/1997 | Sasaki et al. ........... | 369/112.19 |
| 5,831,942 A | * | 11/1998 | Morimoto et al. ....... | 369/13.55 |
| 5,978,346 A | * | 11/1999 | Mizuno et al. ......... | 369/112.17 |
| 6,115,345 A | * | 9/2000 | Kato et al. ............... | 369/112.1 |
| 6,118,748 A | * | 9/2000 | Morimoto .............. | 369/112.02 |
| 6,154,433 A | * | 11/2000 | Hoshino et al. ....... | 369/112.04 |
| 6,442,123 B1 | * | 8/2002 | Nishimoto ............. | 369/112.01 |
| 6,472,651 B1 | * | 10/2002 | Ukai ...................... | 250/201.5 |

* cited by examiner

Primary Examiner—Thang V. Tran
Assistant Examiner—Bach Vuong
(74) Attorney, Agent, or Firm—Greer, Burns & Crain, Ltd.

(57) ABSTRACT

There is disclosed a storage apparatus which is of a system of utilizing a polarized state change by Kerr effect to read information from a storage medium and which easily and precisely performs adjustment to compensate for a phase deviation between both P, S polarized components attributed to an optical system. Phase plates 500, 510 are disposed between a fixed optical section 200 and a movable optical section 190 and the inclination angles of the phase plates are adjusted.

5 Claims, 14 Drawing Sheets

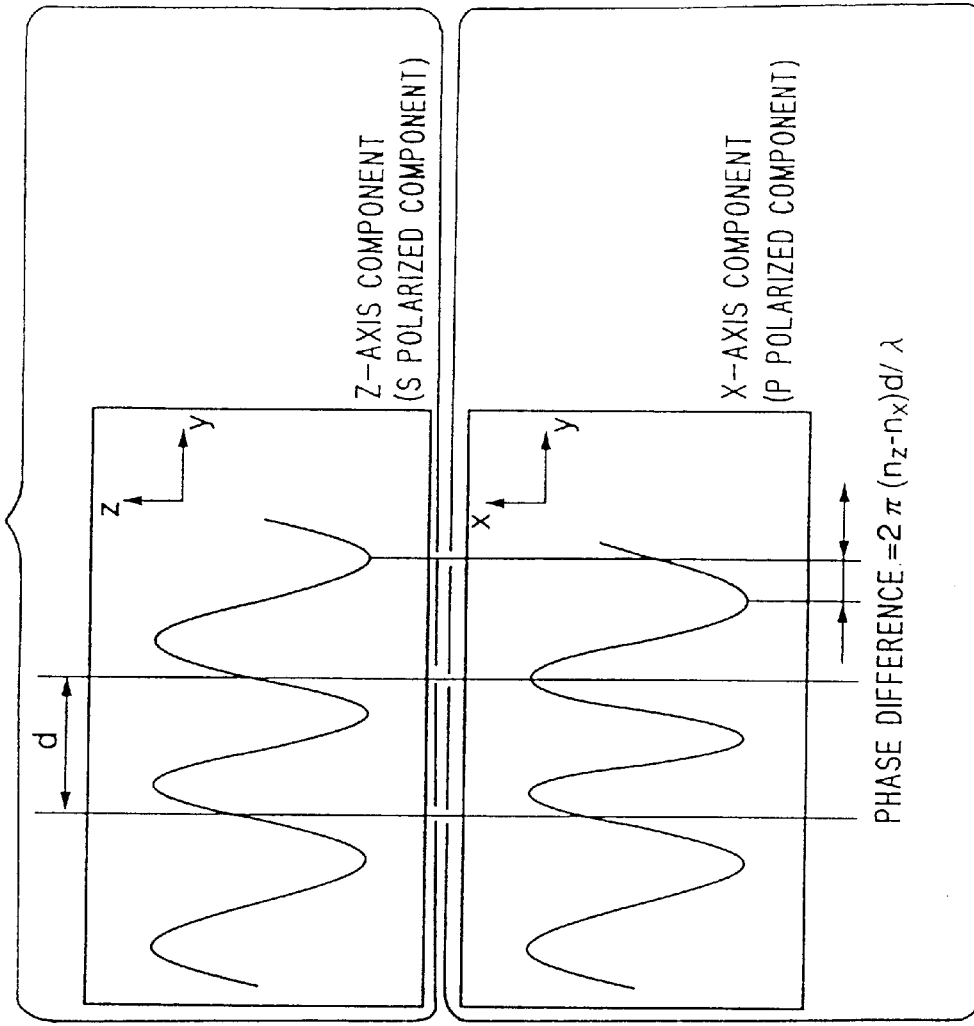
Fig. 9A
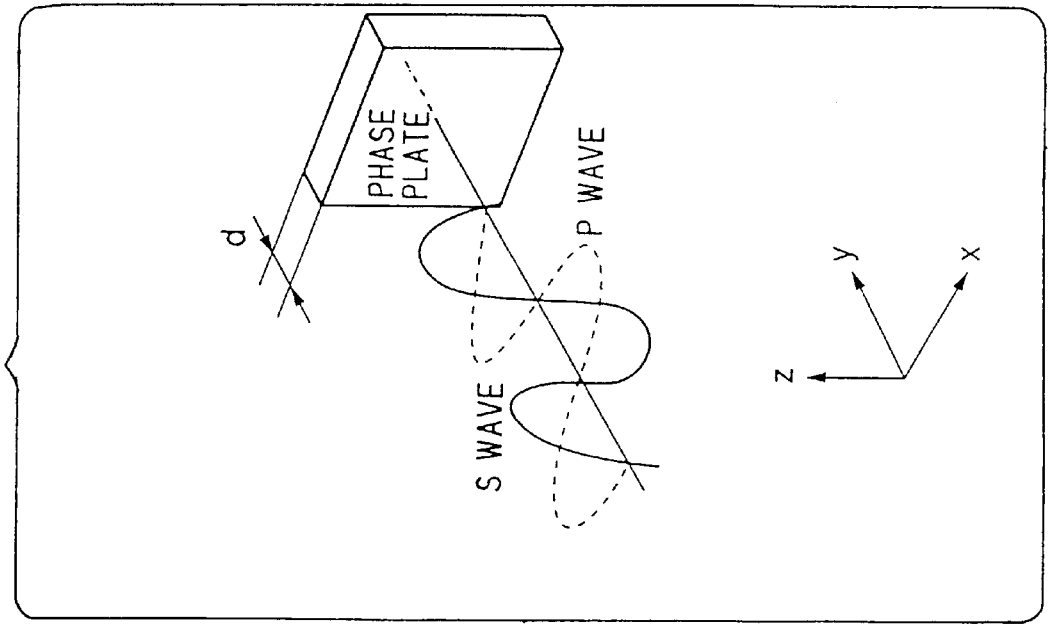
Fig. 9B
Fig. 9C

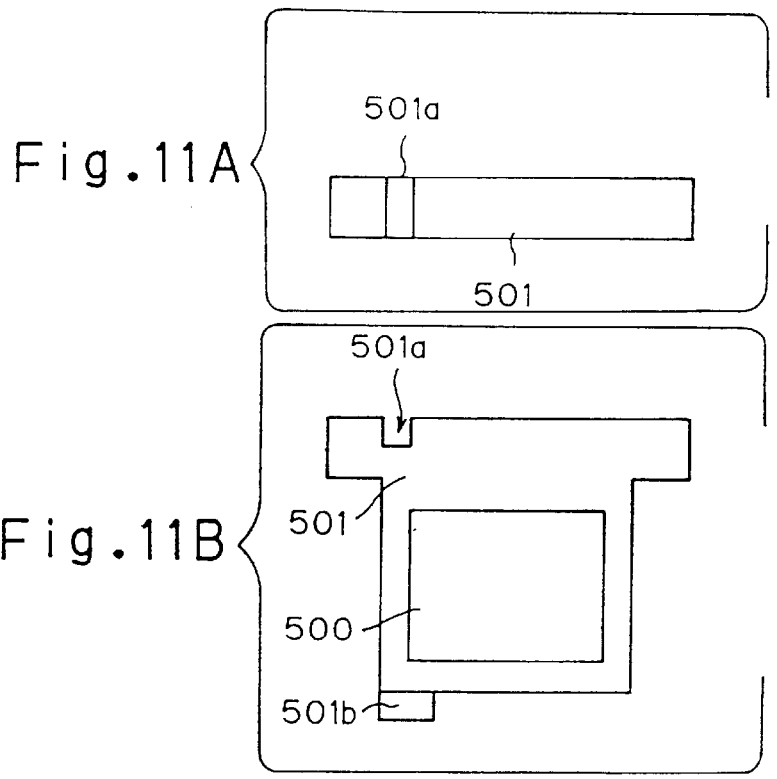
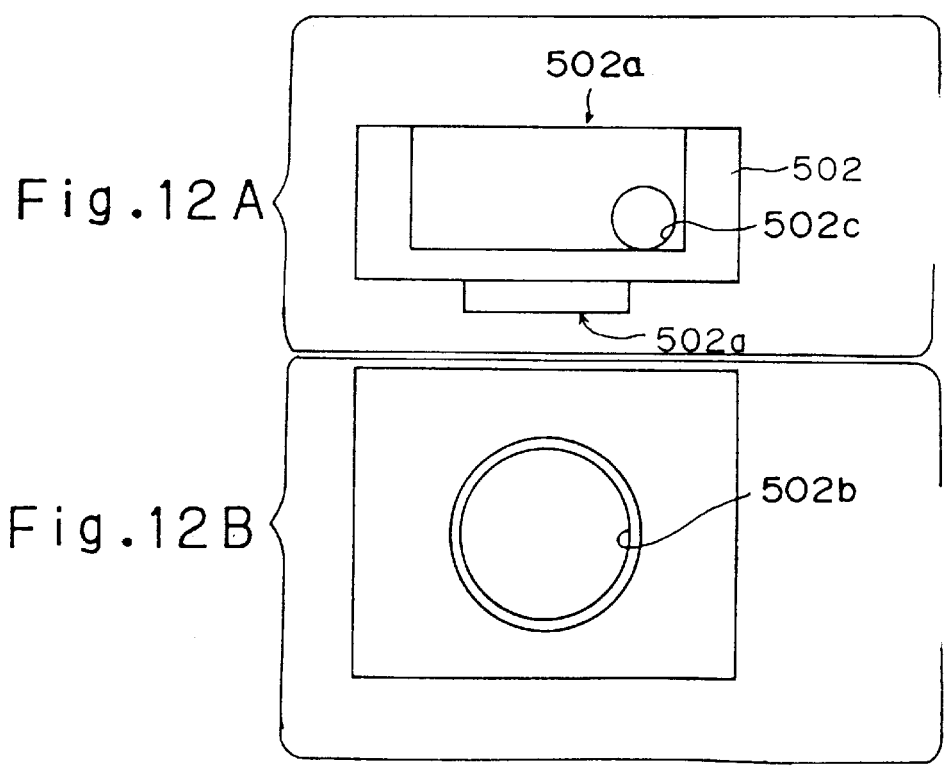

P > S

P = S

P < S

OPTICAL STORAGE APPARATUS AND PHASE COMPENSATION AMOUNT ADJUSTMENT METHOD

BACKGROUND OF THE INVENTION (i) Field of the Invention

The present invention relates to an optical storage apparatus in which by radiating light to a storage medium with information stored therein and receiving the light subjected to a polarized state change in the storage medium, the information stored in the storage medium is read based on the polarized state change.

(ii) Description of the Related Art

As one type of the storage medium in which the information is read based on the change of the polarized state as described above, optical disks such as a magnetic optical (MO) disk have been noted, this type of high capacity storage medium is small-sized, light-weighted, and portable, and further possibilities of high densification and capacity enlargement have been pursued.

In a conventional optical disk drive in which the optical disk is accessed, the optical disk is irradiated with light, and the information stored in the optical disk is read by picking up the reflected light whose polarized state is changed in accordance with the information stored in the optical disk. Specifically, the light reflected by the optical disk is split from the light of a forward path to be radiated to the optical disk by a beam splitter, and further separated into both P, S polarized component beams crossing at right angles to each other by a Wollaston prism, and the beams are incident upon and received by two divided light receiving elements. The received light signal is subjected to a pre-processing by an analog circuit, and subsequently to a signal extraction processing, so that the information is read out.

Here, in the reflected light from the optical disk, besides the change of the polarized state by the intrinsic action of the stored information, a phase change is also generated between both P, S polarized components by the birefringence of the protective layer of the optical disk medium, and further the birefringence is nonuniform over the entire surface of the optical disk and also fluctuates even in one track. Furthermore, the optical system for guiding the reflected light from the optical disk to the light receiving element is provided with a polarized beam splitter, a reflective mirror, and other optical elements in which a phase deviation is possibly generated between both P, S polarized components of the reflected light from the optical disk.

This phase deviation between both P, S polarized components appears as the "surge" of the DC component of the regenerated signal obtained in the stage of pre-processing by an analog circuit after the light receiving element receives light. Even in the optical system, if the phase deviation is generated, the "surge" is remarkably largely emphasized, and there is a possibility that the range of signals able to be handled in a signal extraction processing circuit is exceeded. In this case, there is a problem that correct information (signal) cannot be extracted.

In recent years, because of further capacity enlargement, there has been a tendency to record the information in a region finer than ever with a high density and to regenerate the information by the irradiation with light more intense than ever. In this case, the surge of the DC component of the regenerated signal tends to increase further in proportion to the intensity of the irradiation light.

A conventional method for solving the problem comprises: sorting the components which possibly cause the phase deviations between both P, S polarized components from the components constituting the optical system; or combining the phase deviation directions of a plurality of components causing the phase deviations in the optical system in order to mutually compensate for the phase deviations in the entire optical system.

However, in this method, the process of sorting the components or combining the directions is required, it is difficult to save costs, and the necessity of radiating further intense light to read the information cannot be handled.

Moreover, instead of the above-described method of sorting the components or selecting the combination, a method of disposing a phase plate immediately before the Wollaston prism on the optical path of the reflected light from the optical disk is proposed. This phase plate is an optical component which is disposed and inclined with respect to an optical axis, so that the thickness of the optical axis direction of the phase plate is changed. In accordance with the change of the thickness, that is, an inclination angle, the phase between both P, S polarized components can be adjusted. By disposing the phase plate and adjusting the inclination in each optical system, product dispersions are suppressed while the surge of the regenerated signal DC component can be controlled to provide a low level in any product.

However, in the above-described method of disposing the phase plate and adjusting the inclination angle to adjust the phase deviation between both P, S polarized components in the optical system, when the phase plate inclination is adjusted to adjust the phase deviation, the optical path ahead of the phase plate changes by the light refraction action of the phase plate. It cannot be monitored simply by changing the phase plate inclination whether or not the phase deviation is compensated. Additionally, it cannot be monitored whether or not the phase deviation is compensated until the position of the light receiving element or the like starts to be readjusted with the adjustment of the phase plate inclination. When the phase compensation Is insufficient, a process of readjusting the phase plate inclination and further readjusting the position of the light receiving element or the like to perform the monitoring needs to be repeated. A precise adjustment is abandoned, or the cost increase for the adjusting operation is abandoned and the above-described operation needs to be repeated many times as occasion demands.

SUMMARY OF THE INVENTION

In consideration of the above-described situations, an object of the present invention is to provide an optical storage apparatus including a constitution which can easily compensate for the phase deviation by an optical system between both P, S polarized components of the light subjected to a polarized state change in a storage medium, and a phase compensation amount adjustment method in the optical storage apparatus.

To attain the above-described object, according to the present invention, there is provided an optical storage apparatus in which by radiating light to a storage medium with information stored therein and receiving the light subjected to a polarized state change in the storage medium, the information stored in the storage medium is read based on the polarized state change.

The optical storage apparatus comprises a phase plate disposed in an optical path in which the light reciprocates so that a forward light emitted from a light source is radiated to the storage medium and a backward light subjected to the polarized state change in the storage medium reaches a light receiving element. The phase plate is disposed to compensate for a phase deviation between both P, S polarized components of the backward light.

In the constitution of the optical storage apparatus of the present invention, the light reciprocates by the phase plate. Therefore, when a phase plate inclination is adjusted, the optical path of the light which passes by the phase plate only once changes, but with respect to the light which again passes by the phase plate in a reverse direction, the change of the optical path is canceled. Therefore, by reciprocating the phase plate, even when the phase plate inclination is adjusted, the position of the light receiving element disposed after the phase plate does not need to be adjusted, the degree of phase compensation by the adjustment of the phase plate inclination can immediately be monitored, the adjustment of the phase plate inclination is remarkably facilitated, and a precise adjustment can be performed. Additionally, since the adjusting operation efficiency is high, cost reduction can be realized.

Here, when the light reciprocates by the phase plate, that is, passes by the phase plate twice, the phase plate compensates for the phase deviation between both P, S polarized components of the backward light. Therefore, one passage of the two passages needs to be performed by the backward light, but the other passage may be performed by the forward light. Alternatively, only the backward light may reciprocate by the phase plate twice.

As the optical storage apparatus of the present invention, concretely, the following modes can be employed. Specifically, in the optical storage apparatus, by radiating light to a storage medium with information stored therein and receiving the light subjected to a polarized state change by reflection by the storage medium, the information stored in the storage medium is read based on the polarized state change.

The optical storage apparatus comprises:

a light source for emitting the light to be radiated to the storage medium;

a light receiving element for receiving the light reflected by the storage medium;

a forward path optical system for guiding the light emitted from the light source to the storage medium via a predetermined forward path;

a backward path optical system for guiding the light reflected by the storage medium to the light receiving element via a backward path which traces the forward path in a reverse direction midway after the reflection by the storage medium, leaves the forward path midway and reaches the light receiving element; and a phase plate, disposed on an optical path common to the forward path and the backward path, for compensating for a phase deviation between both P, S polarized components of the light tracing the backward path.

In this case, since the phase plate is disposed on the optical path common to the forward and backward paths, the light emitted from the light source passes by the phase plate once in the forward path, passes once also in the backward path from the reverse direction, and passes twice in total with reciprocation. Even when the phase plate inclination is adjusted, the position of the light receiving element or the like does not need to be readjusted. By monitoring the signal obtained by the light receiving element, and adjusting the phase plate inclination, the phase deviation can precisely and easily be adjusted.

Here, by rotating the phase plate around an axis having a direction different from that of the optical axis passed through the phase plate, the mounting angle of the phase plate to the optical axis is adjusted.

Moreover, when the phase plate is disposed obliquely at a predetermined angle to the optical axis passed through the phase plate, the phase compensation amount between both P, S polarized components preferably becomes zero.

The light passing by the phase plate is slightly reflected by the surface or the back surface of the phase plate. When this reflected light advances along the optical axis, the light possibly forms a noise component. Therefore, to shift the reflected light from the optical axis, the adjustment is preferably completed while the phase plate is disposed obliquely. By designing the phase plate so that the phase compensation amount becomes zero when the phase plate is disposed obliquely at the predetermined angle and so that a sufficient phase compensation width is provided, in any apparatus, the adjustment can be completed while the phase plate is constantly inclined, and the light reflected by the surface and back surface of the phase plate can be prevented from forming the noise light.

Moreover, in the optical storage apparatus of the present invention in which the phase plate is disposed in the optical path common to the forward and backward paths, the optical system formed by combining forward and backward optical systems is separately constituted of a fixed optical section fixed to a predetermined base and including the light source and the light receiving element, and a movable optical section moving with respect to the base in accordance with the access position of the storage medium and including only the optical path common to the forward and backward paths. The phase plate is preferably disposed on the portion of the fixed optical section via which the light is emitted to the movable optical section from the fixed optical section and upon which the light emitted to the fixed optical section from the movable optical section is incident.

When the phase plate is disposed in the above-described position of the fixed optical section, that is, in the position where the light reciprocates from and to the movable optical section, the position is held between the fixed optical section and the movable optical section with relatively a lot of space. Therefore, different from the optical system provided with no phase plate, the phase plate can be disposed without enlarging the entire size of the optical system or while minimizing the enlargement degree.

Here, the phase plate is disposed in the fixed optical section, but additionally a second phase plate for compensating for the phase deviation between both P, S polarized components of the light tracing the backward path is preferably disposed in the portion of the movable optical section upon which the light emitted to the movable optical section from the fixed optical section is incident and via which the light is emitted to the fixed optical section from the movable optical section.

In the adjustment of the phase plate both for the fixed optical section and movable optical section, for example, even when the fixed optical section and movable optical sections are separately assembled, the adjustment for the phase compensation can be performed separately on the fixed optical section and the movable optical section. Moreover, to provide the movable optical section with the phase plate, when the phase plate is disposed in the position between the fixed optical section and the movable optical section, the enlargement of the apparatus by disposing the phase plate can be avoided.

Moreover, when the phase plate is disposed both in the fixed optical section and movable optical section, the phase plate disposed in the fixed optical section and the second phase plate disposed in the movable optical section are preferably disposed in inclined states in opposite directions with respect to the optical axis.

In this constitution, the optical path deviating because of the obliquely disposed phase plate in the fixed optical section can be moved close to the original optical path by the second phase plate disposed in the movable optical section. Additionally, even if the optical path deviates in the movable optical section because of the inclination of the phase plate or the second phase plate for the phase compensation, the optical path deviation can be minimized.

Moreover, to attain the above-described object, according to the present invention, there is provided a phase compensation amount adjustment method for an optical storage apparatus in which by radiating light to a storage medium with information stored therein and receiving the light subjected to a polarized state change by reflection by the storage medium, the information stored in the storage medium is read based on the polarized state change. The optical storage apparatus comprises: a light source for emitting the light to be radiated to the storage medium; a light receiving element for receiving the light reflected by the storage medium; a forward path optical system for guiding the light emitted from the light source to the storage medium via a predetermined forward path; a backward path optical system for guiding the light reflected by the storage medium to the light receiving element via a backward path which traces the forward path in a reverse direction midway after the reflection by the storage medium, leaves the forward path midway and reaches the light receiving element; and a phase plate, disposed on an optical path common to the forward path and the backward path, for compensating for a phase deviation between both P, S polarized components of the light tracing the backward path.

The method of adjusting a phase compensation amount by the phase plate in the optical storage apparatus comprises: using a predetermined reference storage medium as the storage medium; monitoring the signal obtained by the light receiving element; and adjusting the inclination angle of the phase plate to the optical axis to minimize the phase deviation between both P, S polarized components of the light tracing the backward path.

According to the phase compensation amount adjustment method, by preparing as the storage medium the predetermined reference storage medium, typically the storage medium in which there is no change other than the change of the polarized state based on only the stored information, or the other changes are minimized, and accessing the reference storage medium, the phase compensation amount is adjusted. By performing this adjustment to minimize the phase deviation, the phase deviation attributed to the optical system can be compensated separately from the phase deviation in the storage medium.

Moreover, according to the present invention, there is provided a second phase compensation amount adjustment method for an optical storage apparatus in which by radiating light to a storage medium with information stored therein and receiving the light subjected to a polarized state change by reflection by the storage medium, the information stored in the storage medium is read based on the polarized state change. The optical storage apparatus comprises: a light source for emitting the light to be radiated to the storage medium; a light receiving element for receiving the light reflected by the storage medium; a forward path optical system for guiding the light emitted from the light source to the storage medium via a predetermined forward path; a backward path optical system for guiding the light reflected by the storage medium to the light receiving element via a backward path which traces the forward path in a reverse direction midway after the reflection by the storage medium, leaves the forward path midway and reaches the light receiving element; and a phase plate, disposed on an optical path common to the forward path and the backward path, for compensating for a phase deviation between both P, S polarized components of the light tracing the backward path. The phase compensation amount by the phase plate in the optical storage apparatus is adjusted in the method.

The method of adjusting a phase compensation amount by the phase plate in the optical storage apparatus comprises: preparing an adjusting light source for emitting a light imitating the light reflected by the storage medium instead of the above-described light source and storage medium and further preparing an adjusting light receiving element instead of the above-described light receiving element; receiving the imitating light emitted from the adjusting light source by the adjusting light receiving element via at least a part of the backward path including the phase plate; monitoring the signal obtained by the adjusting light receiving element; and adjusting the inclination angle of the phase plate to the optical axis to minimize the phase deviation between both P, S polarized components of the imitating light.

In this case, since the adjusting light source and adjusting light receiving element are prepared, the adjustment for the phase compensation can be performed on a part of the optical system constituting the optical storage apparatus, for example, the above-described fixed optical section.

BRIEF DESCRIPTION OF THE DRAWINGS

FIGS. 9A, 9B, 9C are principle diagrams of a phase plate.

FIGS. 11A, 11B are diagrams showing a rotating member to which the phase plate is fixed.

FIGS. 12A, 12B are diagrams showing a holding member for holding the rotating member with the phase plate fixed thereto.

DETAILED DESCRIPTION OF THE PREFERRED EMBODIMENTS

Embodiments of the present invention will be described hereinafter.

Figure 1:
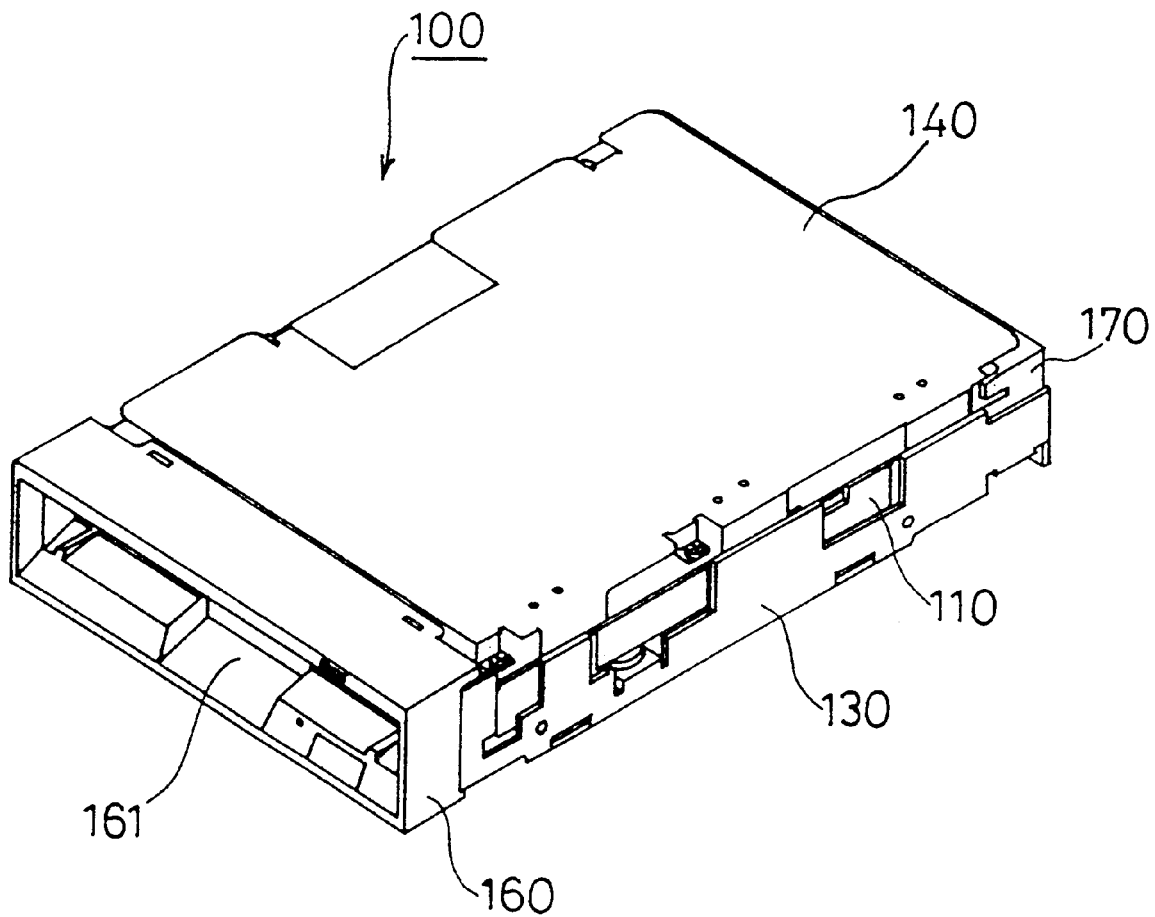
FIG. 1 is a perspective view of one embodiment of an optical storage apparatus of the present invention as seen from the surface side.
Figure 2:
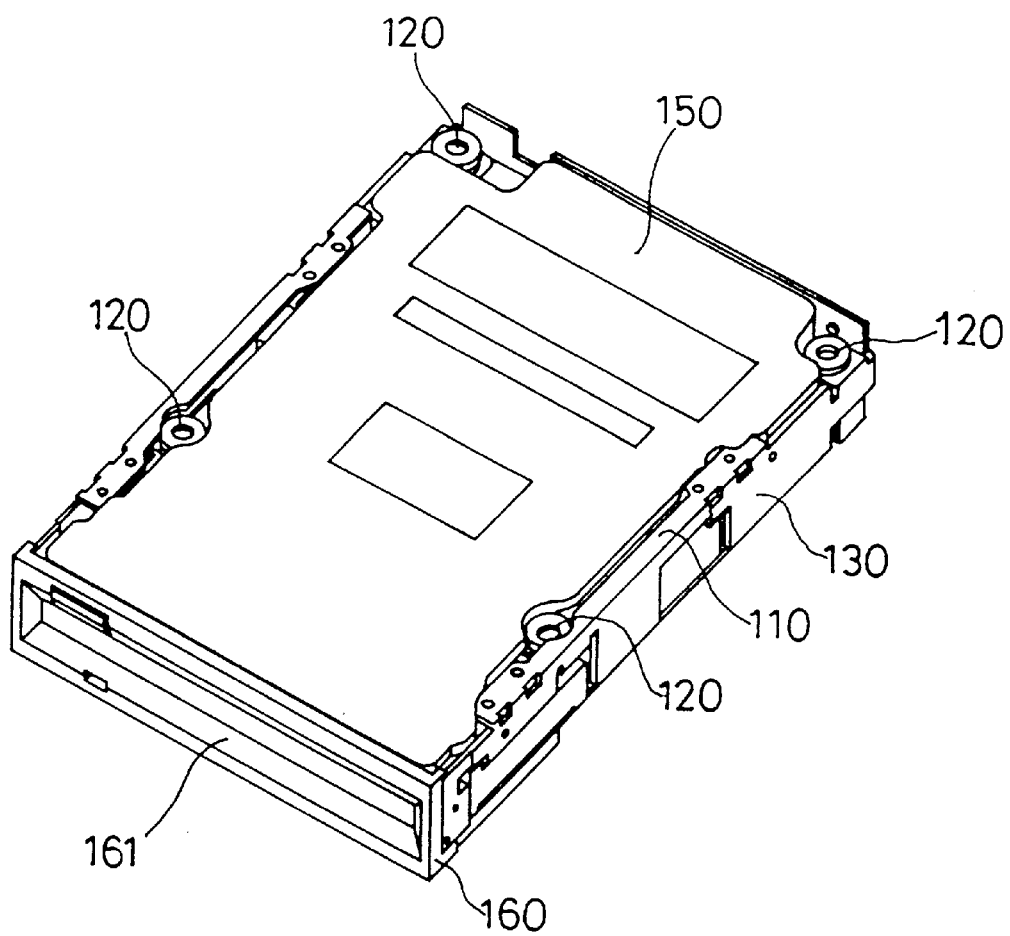
FIG. 2 is a perspective view of one embodiment of the optical storage apparatus of the present invention as seen from the back surface side.

FIG. 1 is a perspective view of one embodiment of an optical storage apparatus of the present invention as seen from the surface side, and FIG. 2 is a perspective view as seen from the back surface side.

An optical storage apparatus 100 is provided with a drive base 110 of an aluminum alloy which is a base of optical storage apparatus 100, and a frame 130 is attached to the drive base 110 via four rubber vibration insulators 120. Moreover, a top cover 140 and a bottom cover 150 are fixedly screwed to the drive base 110.

A front panel 160 is attached to the frame 130, and is provided with an insertion port 161 via which an optical disk cartridge incorporating a disc-shaped optical disk as one example of the storage medium of the present invention is inserted to the optical storage apparatus 100.

The front panel 160 is attached to the front end of the optical storage apparatus 100, while a rear end is provided with a connector 170 for electrically connecting the optical storage apparatus 100 to apparatuses such as a computer.

Figure 3:
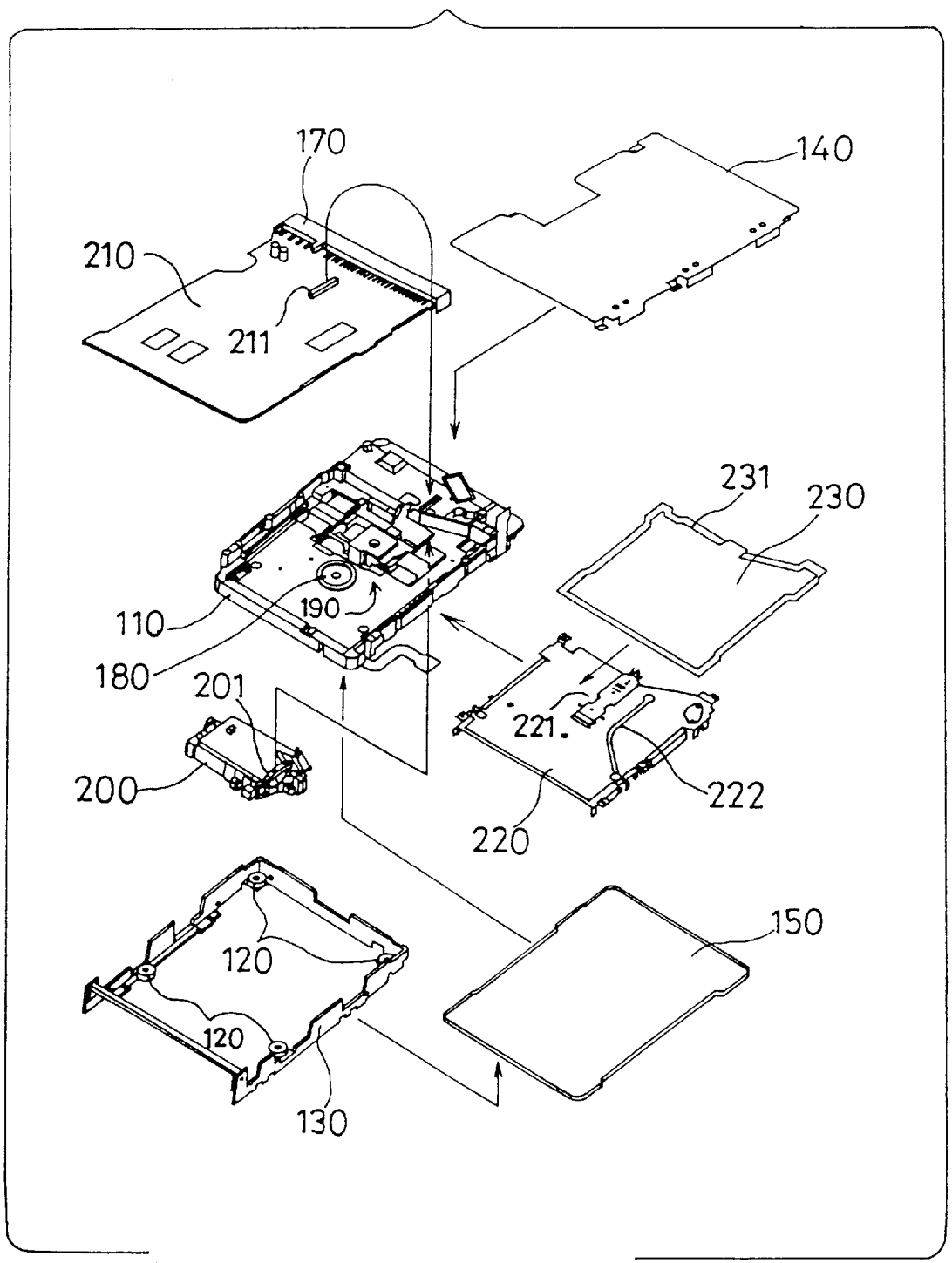
FIG. 3 is an exploded perspective view of the optical storage apparatus shown in FIGS. 1 and 2.

FIG. 3 is an exploded perspective view of the optical storage apparatus shown in FIGS. 1 and 2.

A spindle motor 180 for holding and rotating the optical disk is mounted on the drive base 110. Moreover, mounted on the drive base 110 is an optical head including a movable optical section 190 movable in the radial direction of the optical disk and a fixed optical section 200 fixed to the drive base 110. The fixed optical section 200 is fixed to the back surface of the drive base 110. Moreover, the fixed optical section 200 is provided with a connector 201 for electric connection to a printed wiring board 210 described later.

FIG. 3 shows a bias magnet assembly 221 for sliding a permanent magnet to turn on/off a bias magnetic field applied to the optical disk, and an optical disk cartridge loading assembly 220 provided with an opening/closing arm 222 for opening/closing an optical disk cartridge shutter, and the optical disk cartridge loading assembly 220 is fixedly screwed on the surface of the drive base 110. An insulating sheet 230 is mounted on the surface of the optical disk cartridge loading assembly 220, and a seal member 231 is attached to the outer periphery of the insulating sheet 230 for enhancing sealing properties to prevent dust from adhering to the optical disk.

Moreover, FIG. 3 shows a connector 211 for connection to the connector 201 of the fixed optical section 200, and the back surface side of the printed wiring board 210 provided with the connector 170 for the electric connection to the external apparatuses and including a drive control circuit for controlling the drive of the optical head. The printed wiring board 210 is mounted on the drive base 110 via the insulating sheet 230 to interconnect the connector 211 of the printed wiring board 210 and the connector 201 of the fixed optical section 200, and is fixedly screwed to the drive base 110.

Furthermore, the top cover 140 is fixedly screwed to the drive base 110 via the printed wiring board 210, and the bottom cover 150 is fixedly screwed to the back surface side of the drive base 110. Finally, the drive base is attached to the frame 130 via the rubber vibration insulators 120.

Figure 4:
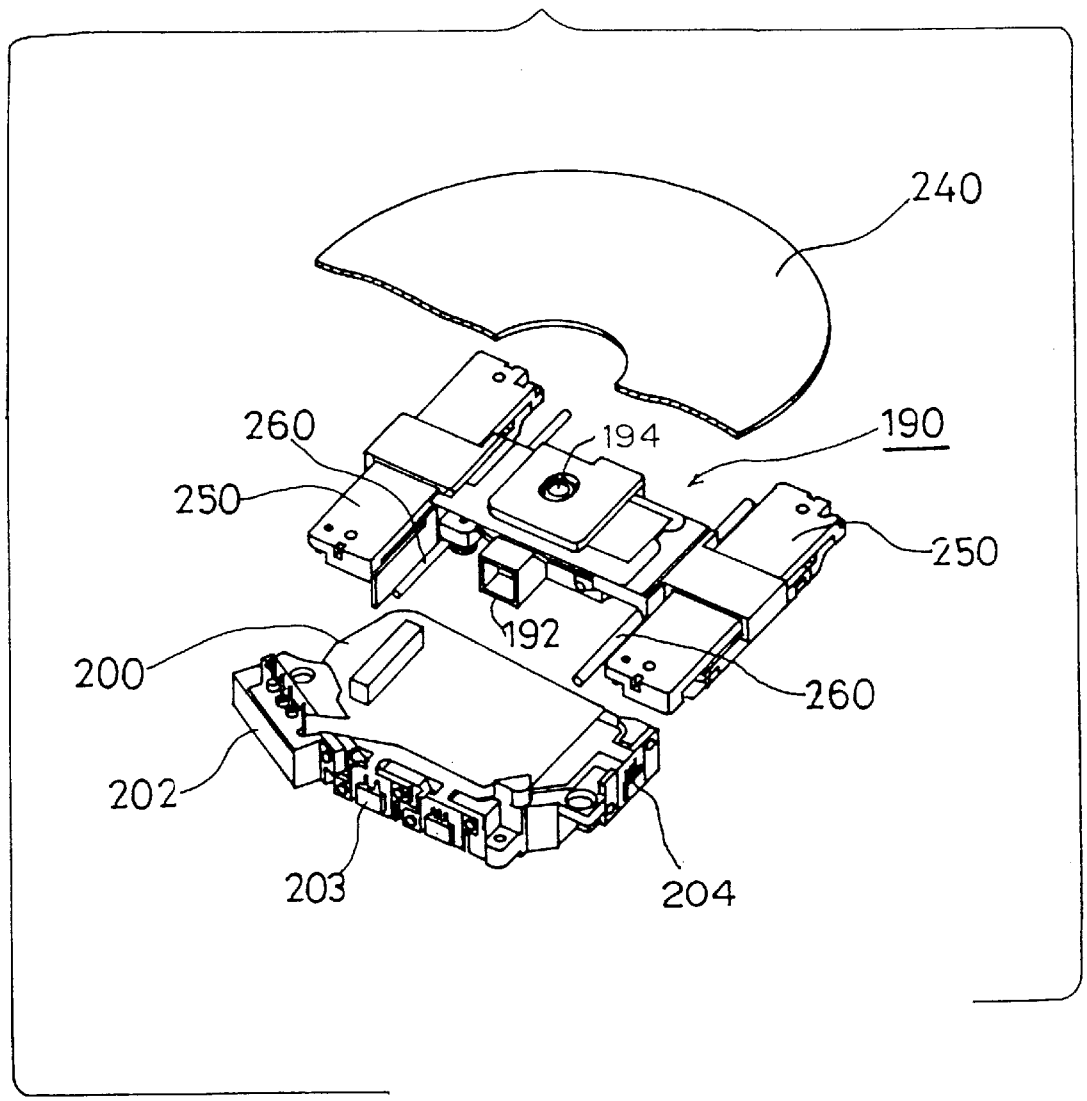
FIG. 4 is a perspective view showing the mounting relation between a fixed optical section and a movable optical section.

FIG. 4 is a perspective view showing the mounting relation of the fixed and movable optical sections, and the drive base is omitted from the drawing.

The fixed optical section 200 includes: a semiconductor laser 202 for generating laser beams for use in reading/writing information as one example of the light source mentioned in the present invention; a light receiving element 203 for detecting the signal included in the light reflected by an optical disk 240 and indicating the information stored in the optical disk 240; and a light receiving element 204 for detecting the position deviation of a converging spot with respect to a concentric circular track disposed on the optical disk as the place for storing the information, and the focus deviation of the converging spot.

The movable optical section 190 is driven by a pair of magnetic circuits 250 and moves along a pair of guide rails 260 in the radial direction of the optical disk 240. The movable optical section 190 incorporates an actuator for finely adjusting the position of an objective lens 300 to adjust the focus of the converging spot and to position the converging spot on the track. Moreover, the movable optical section 190 is provided with a nozzle 192 having a square section, and a laser beam emitted from the semiconductor laser 202 of the fixed optical section 200 and converted to a parallel beam as described later enters the movable optical section 190 via the nozzle 192. Furthermore, the light reflected by the optical disk 240 returns to the fixed optical section 200 via the nozzle 192. Additionally, the movable optical section 190 also incorporates a reflective mirror 193 (see FIG. 5) for transmitting the laser beam entering via the nozzle 192 to the objective lens 300.

Figure 5:
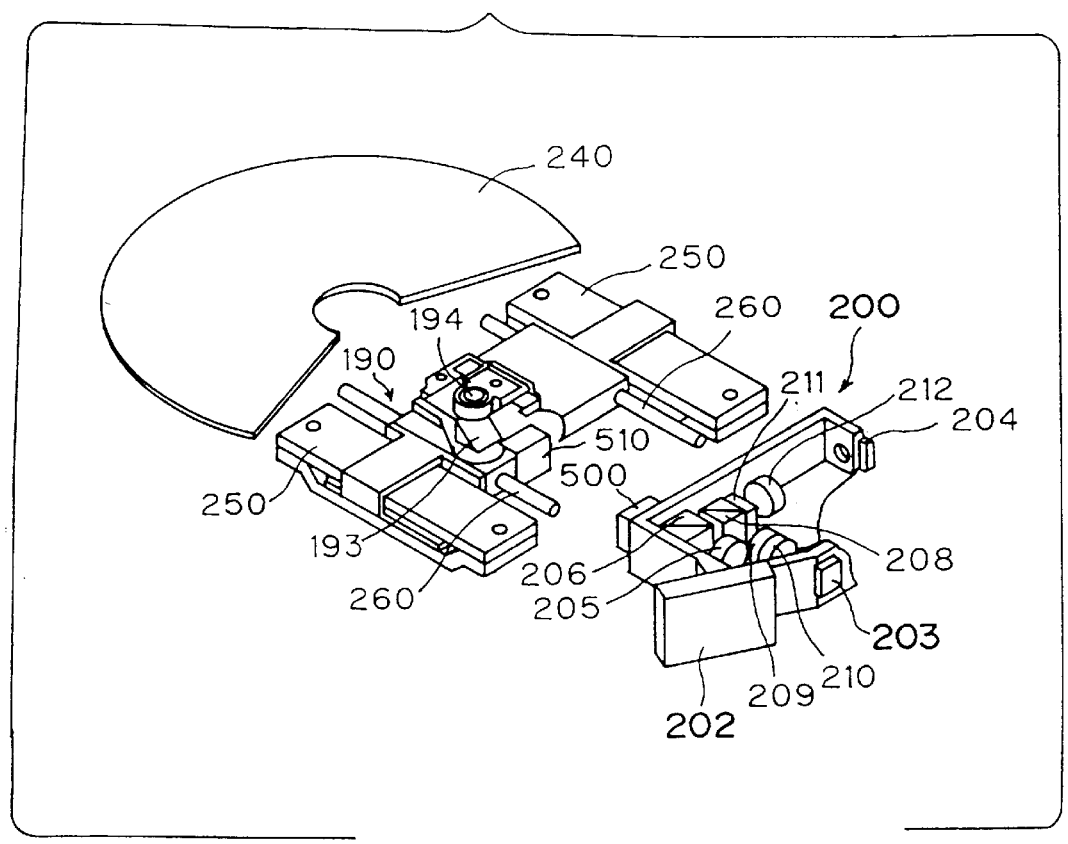
FIG. 5 is a partially cut perspective view showing optical components disposed in the fixed and movable optical sections in the mounting relation of the fixed and movable optical sections.
Figure 6:
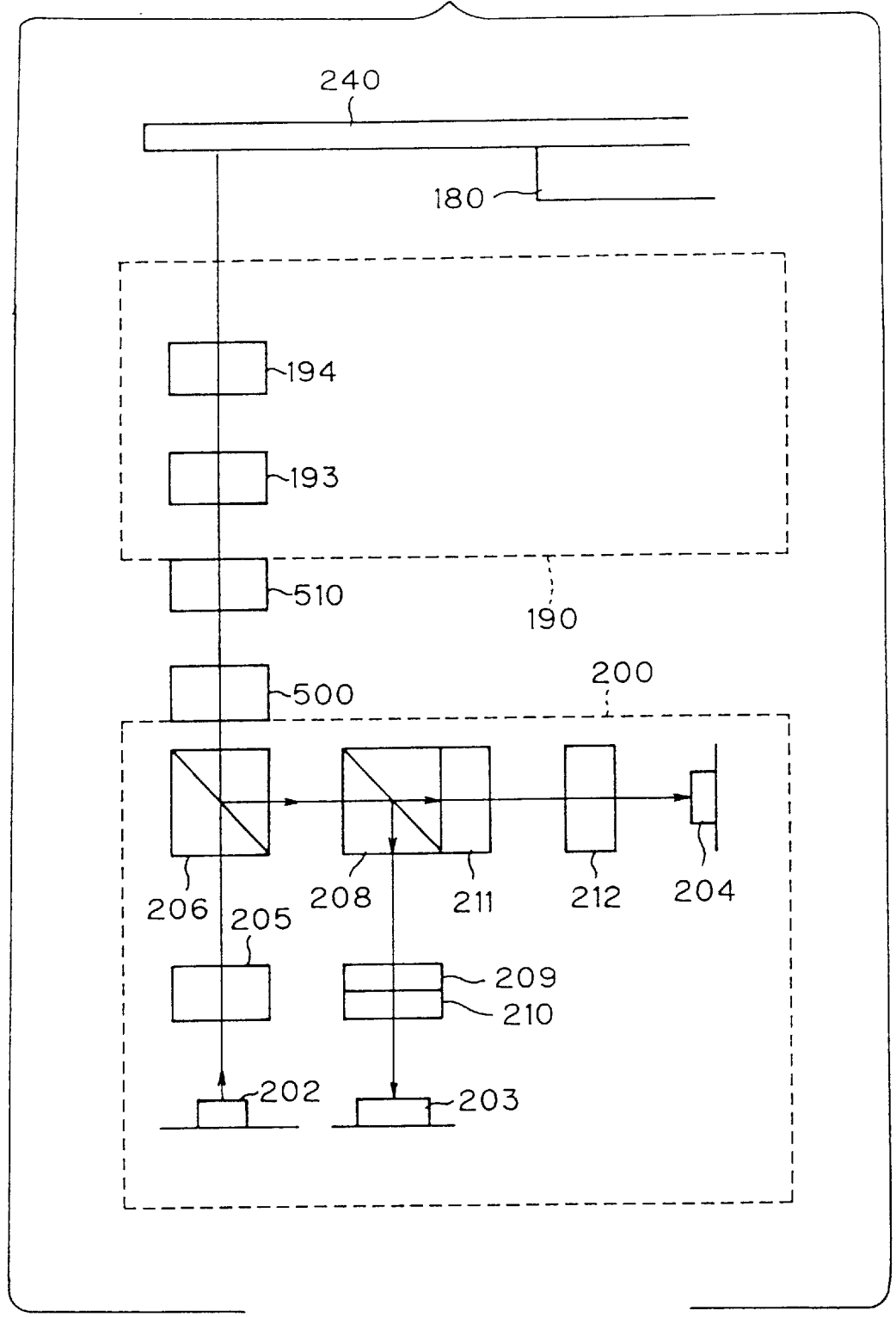
FIG. 6 is a diagram showing a functional mounting relation of the optical components constituting the fixed and movable optical sections.

FIG. 5 is a partially cut perspective view showing optical components disposed in the fixed and movable optical sections in the mounting relation of the fixed and movable optical sections, and FIG. 6 is a diagram ignoring the physical layout and showing the functional mounting relation of the optical components constituting the fixed and movable optical sections. Here, the optical system constituted of the fixed and movable optical sections will be described with reference to FIGS. 5 and 6.

The luminous flux emitted from the semiconductor laser 202 is converted to the parallel beam by a collimator lens 205, transmitted through a first polarized beam splitter 206 and a first phase plate 500 movably/adjustably constituted as described later and emitted from the fixed optical section 200. The parallel luminous flux emitted from the fixed optical section 200 is transmitted through another or second phase plate 510 movably/adjustably constituted and fixed to the movable optical section 190, and incident upon the inside of the movable optical section 190. The parallel luminous flux incident upon the inside of the movable optical section 190 is reflected by the reflective mirror 193, raised upward (see FIG. 5), converged by an objective lens 194, and radiated to the optical disk 240 rotated by the spindle motor 180.

Here, the laser beam emitted from the semiconductor laser 202 is linearly polarized, this laser beam is incident upon the first polarized beam splitter 206 as a P polarized light, and the P polarized light is incident upon the optical disk 240 as it is. When the P polarized light incident upon the optical disk 240 is reflected by the optical disk 240, the polarized surface of the light rotates only by Kerr rotation angle $\theta_k$ or $-\theta_k$ by Kerr effect. The rotation direction differs by the magnetization direction of the incidence position of the optical disk 240. Binary information "1" or "0" is recorded in the optical disk 240 in accordance with the magnetization direction, and the information is read as the change of the polarization direction by Kerr effect.

The laser beam radiated to the optical disk 240 is reflected by the optical disk 240, subsequently traces the objective lens 194, reflective mirror 193 and second phase plate 510 in reverse to the forward path, emanates from the movable optical section 190, and is transmitted through the first phase plate 500 and incident upon the inside of the fixed optical section 200. The return light incident upon the inside of the fixed optical section 200 is split from the optical path common to the forward path by changing the direction by 90° by the first polarized beam splitter 206, and split into a beam containing S wave components and a beam hardly containing the S wave components by a second beam splitter 208. Here, in the optical system, the reflective mirror 193 and first and second polarized beam splitters 206, 208 may be factors to cause the phase deviation between both P, S polarized components. However, when the return light is split by the second polarized beam splitter 208, the phase compensation is performed by the first and second phase plates 500, 510 so that there is substantially no phase difference between both P, S polarized components.

The principle of the phase compensation by the first and second phase plates, and the method of performing the phase compensation will be described later.

As described above, the second polarized beam splitter 208 splits the beam into the beam containing the S wave components and the beam containing few S wave components. One beam containing few S wave components is transmitted through the second polarized beam splitter 208, further converged to the light receiving element 204 via a Foucault prism 211 and a servo lens 212, and received by the light receiving element 204. The received light signal obtained by the light receiving element 204 is used for generating a track error signal and a focus error signal.

On the other hand, the other beam containing the S wave components split by the second polarized beam splitter 208 is changed in direction by 90° by the second polarized beam splitter 208, split to two beams formed of polarized components (P and S waves) crossing at right angles to each other by a Wollaston prism 209, and converged to a regenerating signal light receiving element 203 by a converging lens 210. The received light signal obtained by the light receiving element 203 is used as a signal for regenerating the information. For the signal, since the phase difference between both P, S components of the light incident upon the light receiving element 203 is already corrected, the surge of the DC component of the regenerating signal is reduced as described later.

Additionally, as shown in FIG. 5, the semiconductor laser 202 is disposed obliquely to the optical axes of the collimator lens 205 and first polarized beam splitter 206. Since the laser beam emitted from the semiconductor laser 202 is extended in an elliptical form, the semiconductor laser 202 is obliquely disposed. The laser beam emitted from the semiconductor laser 202 is deformed to be circular by a prism (not shown in FIGS. 5, 6), changes its advancing direction, and is incident upon the collimator lens 205.

Figure 7:
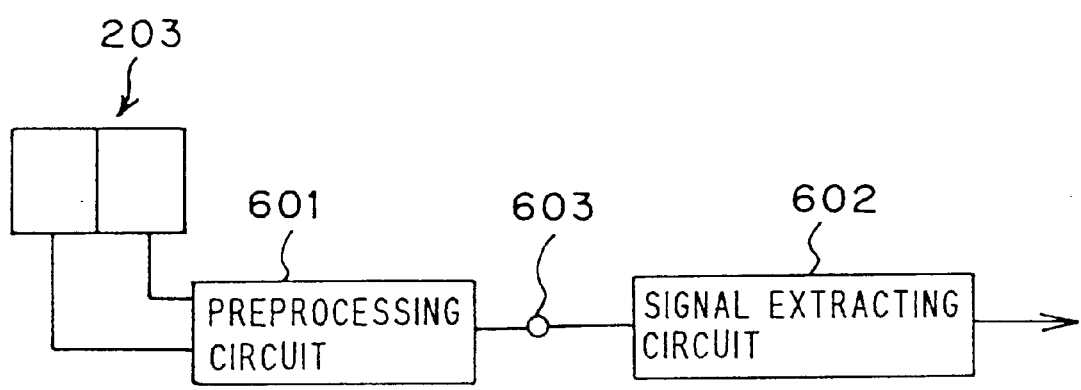
FIG. 7 is a schematic diagram showing a processing of a signal obtained by receiving light by a regenerating signal light receiving element shown in FIGS. 5 and 6.

FIG. 7 is a schematic diagram showing a processing of a signal obtained by receiving light by a regenerating signal light receiving element shown in FIGS. 5 and 6.

The light receiving element 203 is divided into two elements for receiving P wave light and S wave light. The received light signal obtained by the two divided light receiving elements is inputted to a preprocessing circuit 601 constituted of an analog circuit, subjected to a preparatory processing, and then inputted to a signal extracting circuit 602 constituted of LSI, and a binary signal of "1" or "0" is extracted for each bit.

Figure 8B:
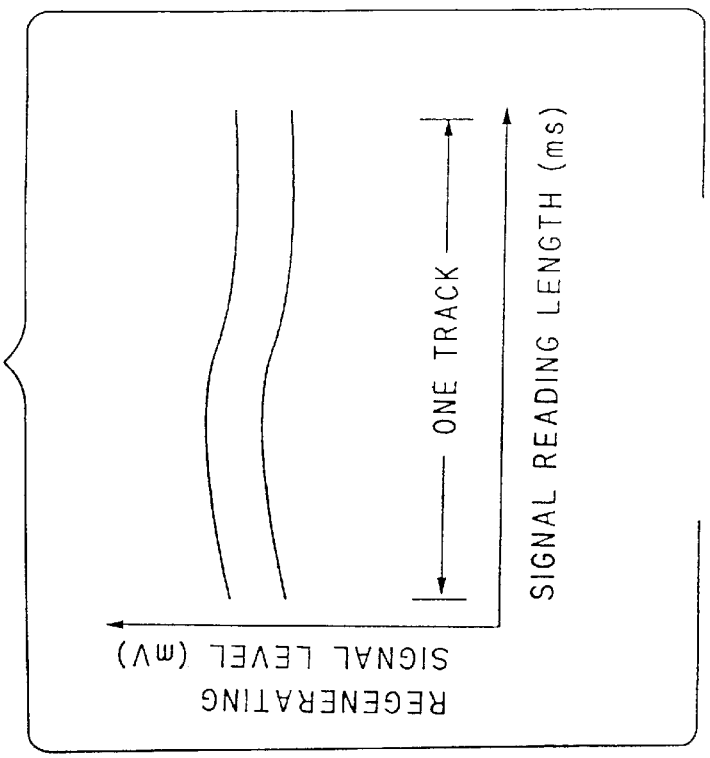
FIGS. 8A and 8B are schematic diagrams showing regenerating signal waveforms.
Figure 8A:
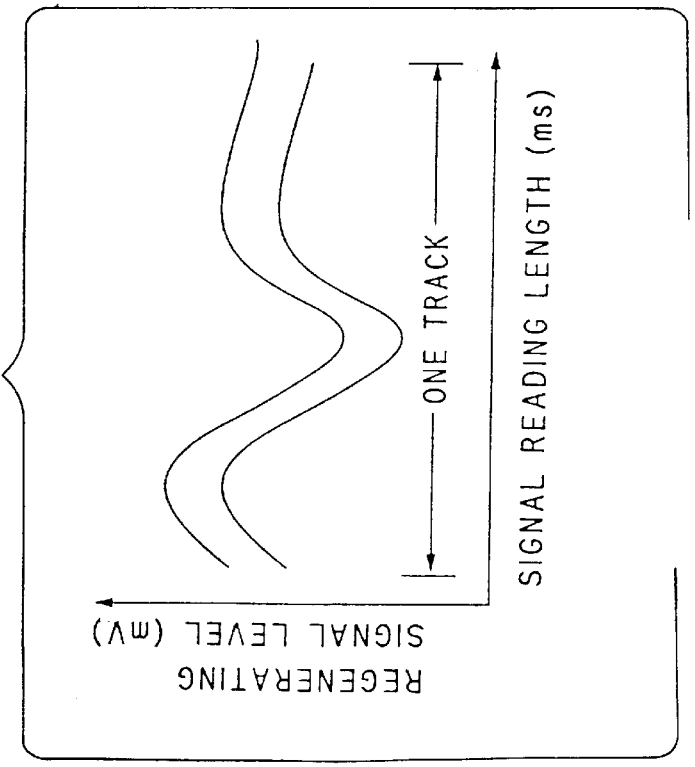

FIGS. 8a and 8b are schematic diagrams showing regenerating signal waveforms when observed by a node 603 between the preprocessing circuit 601 and the signal extracting circuit 602 shown in FIG. 7.

FIG. 8A shows a regenerating signal waveform before the phase compensation by the first and second phase plates 500, 510 as shown in FIGS. 5, 6, and FIG. 8B shows a regenerating signal after the phase compensation. Two lines are shown, and the upper and lower lines indicate, for example, bits "1" and "0", respectively. Since a remarkably large number of bit signals are present in one track, the signals are observed to spread between the two lines as shown in FIG. 8A.

Here, a large "surge" is generated in the DC component of the regenerating signal as shown in FIG. 8A before performing the phase compensation by the first and second phase compensating plates 500, 510. The cause of this surge lies in that the fluctuation, as shown in FIG. 8B, of the phase deviation between both P, S polarized components with the place on the optical disk 240 because of the birefringence of the optical disk 240 during one rotation of the optical disk 240 (for one track) is largely emphasized by the phase deviation attributed to the optical system as shown in FIG. 8A. When a large surge exists as shown in FIG. 8A, the level at which the signal extraction processing can be performed in the signal extracting circuit 602 shown in FIG. 7 deviates, and there is a possibility that a correct signal regeneration cannot be performed.

When the phase deviation attributed to the optical system is compensated using the first and second phase plates 500, 510, as shown in FIG. 8B, the surge of the DC component is sufficiently suppressed, there is no possibility of exceeding the level at which the signal processing can be performed in the signal extracting circuit 602 shown in FIG. 7, and a correct signal regeneration can be performed.

FIGS. 9A, 9B, 9C are principle diagrams of the phase plate.

FIG. 9A is a schematic diagram showing that the P and S waves with matched phases are incident upon the phase plate.

The phase plate is formed by placing two crystal plates together so that the directions of crystal axes deviate from each other by 90°, and has birefringent properties in which the refractive index differs with the z-axis and x-axis directions. When the beams with matched phases are incident upon the phase plate as shown in FIG. 9A, a phase difference $\delta$ between both P, S polarized components of the light transmitted through the phase plate is as follows:

$$\delta = 2\pi(n_z - n_x)(d/\lambda)$$

in which $n_z$, $n_x$, denote the refractive indexes of z and x directions, d denotes the thickness of the phase plate, and $\lambda$ denotes the wavelength of the, light.

Here, the phase difference $\delta$ is related with the phase plate thickness d. When the phase plate is inclined with respect to the optical axis, the thickness of the optical axis direction changes, and the phase difference δ can be adjusted.

Figure 10:
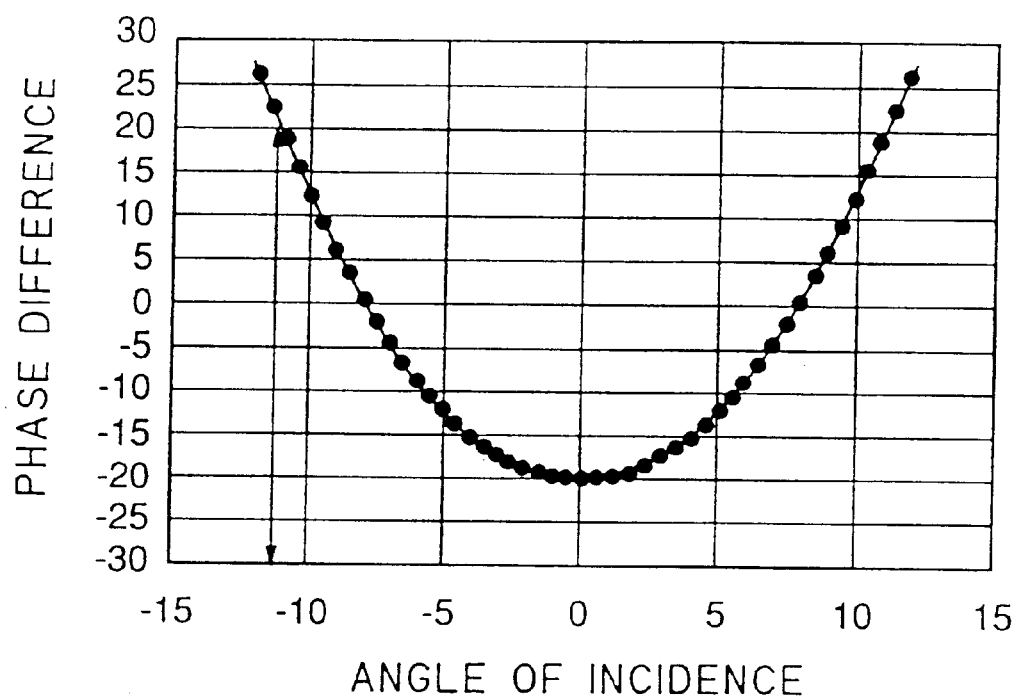
FIG. 10 is a graph showing a phase difference with respect to the angle of incidence of the phase plate (the inclination angle of the phase plate to an optical axis).

FIG. 10 is a graph showing the phase difference with respect to the angle of incidence of the phase plate employed in the present embodiment (the inclination angle of the phase plate to the optical axis).

The phase plate is designed so that at a certain inclination angle (about 8°), the phase compensation amount becomes zero (the phase difference of the incident light indicates the phase difference of the transmitted light as it is). When the phase plate inclination angle is set to 0° (the phase plate is disposed so that the incident light is incident vertical to the phase plate), the phase compensation amount reaches −20°. When the phase plate is inclined to about 12°, the phase compensation amount reaches +20°.

Here, the phase deviation attributed to the optical system shown in FIGS. 5, 6 is less than ±20° at maximum. Therefore, when the phase plate having the properties shown in FIG. 10 is used in the optical system shown in FIGS. 5, 6, the phase plate is disposed to be necessarily inclined with respect to the optical axis. The phase plate provided with the properties shown in FIG. 10 is employed in the first and second phase plates 500, 510 in the optical system shown in FIGS. 5, 6.

Figure 13:
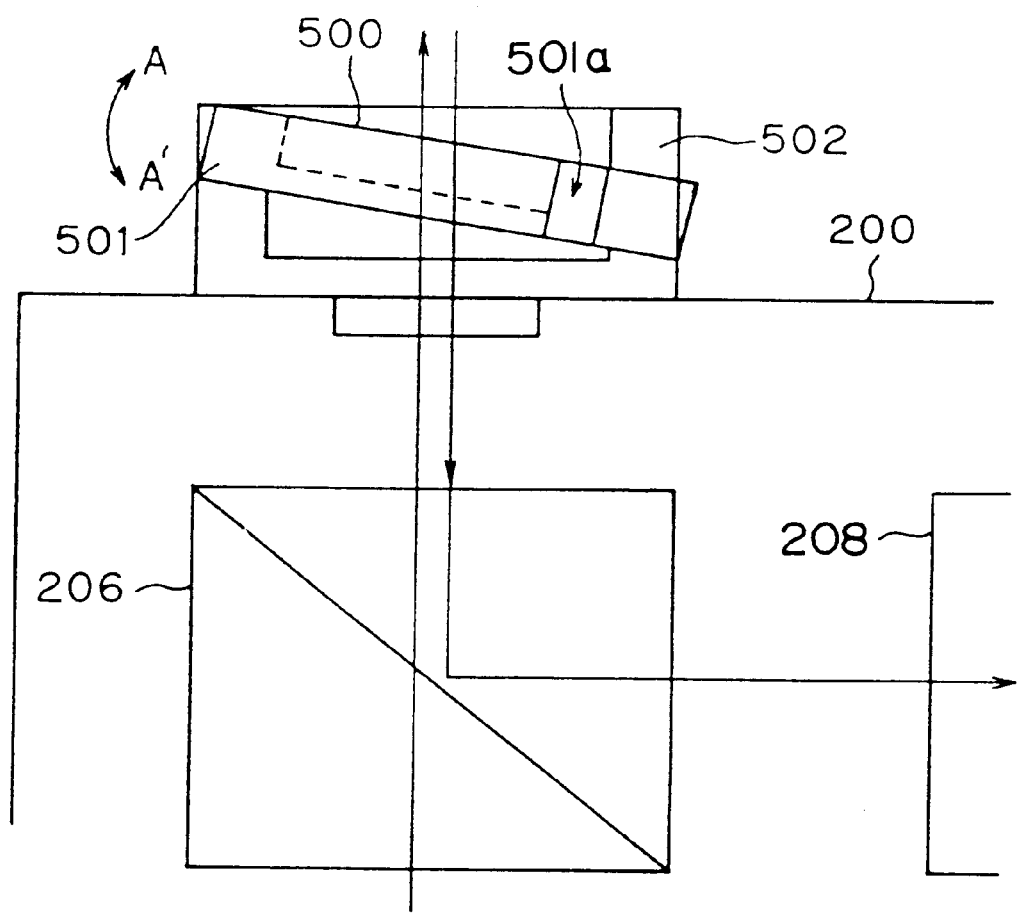
FIG. 13 is a diagram showing a phase compensation mechanism constituted of the rotating member with the phase plate fixed thereto and the holding member.

FIGS. 11A and 11B are diagrams showing a rotating member to which the phase plate is fixed, FIG. 12 is a diagram showing a holding member for holding the rotating member with the phase plate fixed thereto, and FIG. 13 is a diagram showing a phase compensation mechanism constituted of the rotating member with the phase plate fixed thereto and the holding member.

FIGS. 11A, 11B are a plan view and a front view of a rotating member 501, respectively, and the rotating member 501 is a plate member with the phase plate 500 bonded/fixed to an opening formed in the middle.

A groove 501a for rotating the rotating member 501 is formed in the upper part of the plate rotating member 501, and a rotating shaft 501b is protruded from the lower part of the member.

FIGS. 12A, 12B are a plan view and a front view of the holding member for holding the rotating member shown in FIG. 11, respectively. In a holding member 502, a circular opening 502b for passing the light is formed in an indentation 502a in which the phase plate 500 fixed to the rotating member 501 is disposed, and a shaft hole 502c for accepting the rotating shaft 501b of the rotating member 501 is formed.

The phase plate 500 is bonded and fixed to the rotating member 501, and the rotating member 501 with the phase plate 500 fixed thereto is held by the holding member 502 so that the rotating shaft 501b of the rotating member 501 is inserted in the shaft hole 502c of the holding member 502.

As shown in FIGS. 5, 6 and 13, the holding member 502 for holding the rotating member 501 is fixed to the portion of the housing of the fixed optical section 200 via which the laser beam is received from or transmitted to the movable optical section 190. By inserting an adjustment jig, such as a minus driver, to the groove 501a of the rotating member 501 and turning the jig in the direction of arrow A–A' shown in FIG. 13, the adjustment for compensating for the phase deviation attributed to the optical system is performed.

To perform the adjustment, for the optical disk 240, an optical disk remarkably small in dispersions of birefringence with places is selected and used as a reference optical disk. By mounting the reference optical disk, operating the optical storage apparatus to read the information from the optical disk, and observing the regenerating signal waveform as shown in FIG. 8 at the node 603 shown in FIG. 7, the rotating member 501 (phase plate 500) is rotated/adjusted so as to substantially eliminate the surge of the DC component. In this case, for the laser beam directed to the movable optical section from the fixed optical section 200, its optical path changes by the change of the inclination angle of the phase plate 500. However, for the light returned to the fixed optical section 200 from the movable optical section, in the phase plate 500, the optical path changes in the reverse direction by the same change amount as that in the forward path, and the original optical path is completely returned. Therefore, the optical components constituting the fixed optical section 200 including the light receiving element 203 do not have to be readjusted with the change of inclination angle of the phase plate 500, and the inclination adjustment of the phase plate 500 for the phase compensation can be remarkably easy to perform.

As a comparative example, as heretofore assumed, the phase plate is disposed between the second polarized beam splitter 208 and the Wollaston prism 209 shown in FIG. 6 and the phase compensation is performed by adjusting the inclination angle of the phase plate. In this case, since the optical path of the transmitted light to the light receiving element 203 from the phase plate changes in accordance with the inclination angle of the phase plate, with the change of the inclination angle of the phase plate, no light is correctly converged onto the light receiving element 203. Therefore, every time the inclination angle of the phase plate is changed, the position of the light receiving element 203 is readjusted. The phase deviation after the inclination angle of the phase plate is changed cannot be monitored until the readjustment starts to be correctly performed. Therefore, the adjustment of the phase plate inclination for the phase compensation becomes remarkably troublesome, which results in cost increase.

Moreover, in the present embodiment, since the phase plate is disposed in a relatively wide space which can be secured between the fixed optical section and the movable optical section, the apparatus can be reduced in size as compared with the constitution in which the phase plate is disposed inside the fixed optical section or the movable optical section.

After the rotating member 501 (phase plate 500) is rotated in the direction A–A' shown in FIG. 13 and the inclination is adjusted, the rotating member 501 is bonded and fixed to the holding member 502.

Figure 14:
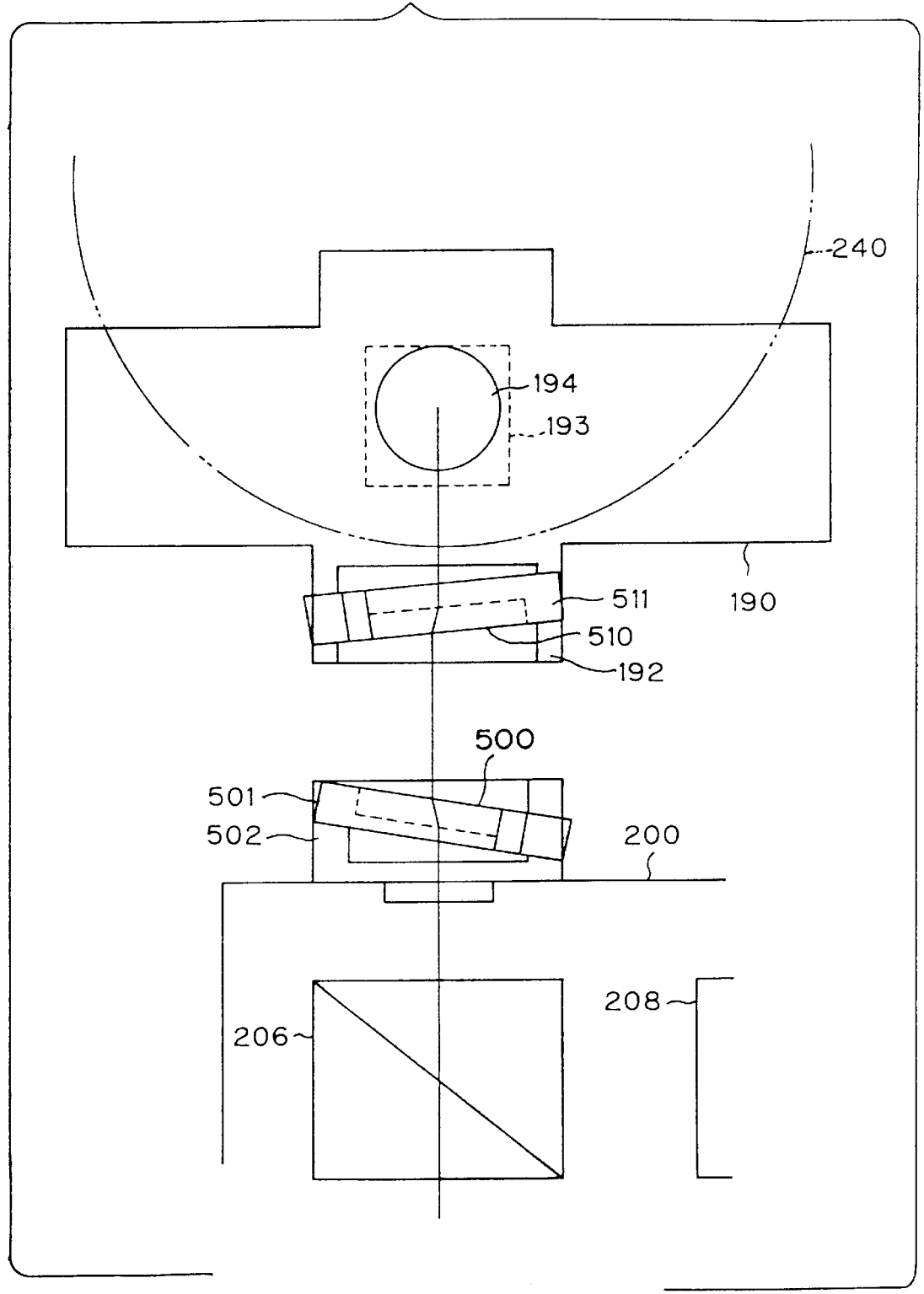
FIG. 14 is a diagram showing a first phase plate disposed in the fixed optical section, a second phase plate disposed in the movable optical section, and phase compensation mechanisms for both plates.

FIG. 14 is a diagram showing the first phase plate disposed in the fixed optical section, the second phase plate disposed in the movable optical section, and the phase compensation mechanisms for both plates.

The phase compensation mechanism disposed in the fixed optical section 200 and provided with the rotating member 501 with the first phase plate 500 fixed thereto and the holding member 502 holding the rotating member 501 has been described with reference to FIG. 13, and the description thereof is omitted here.

The phase compensation mechanism of the movable optical section 190 is constituted by a combination of a rotating member 511 with the second phase plate 510 fixed thereto and having the same structure as that of the rotating member 501 of the phase compensation mechanism of the movable optical section 190, and the nozzle 192 (see FIG. 4) as a part of the housing of the movable optical section 190 processed in the same structure as that of the holding member 502 of the phase compensation mechanism on the side of the fixed optical section 200.

Here, the rotating member 501 (first phase plate 500) constituting the phase compensation mechanism on the side of the fixed optical section 200 and the rotating member 511 (second phase plate 510) constituting the phase compensation mechanism on the side of the movable optical section 190 are inclined from each other in opposite directions with respect to the optical axis. Since the members are inclined in the opposite directions in this manner, and the first phase plate 500 is disposed with an inclination from the optical axis, the laser beam emitted to the movable optical section 190 from the fixed optical section 200 causes a deviation in the optical path as shown in FIG. 14. However, since the second phase plate 510 is inclined in the reverse direction, the optical path is returned to some degrees. Therefore, much optical deviation is not generated inside the movable optical section 190. Additionally, only one phase plate (e.g., the phase plate 500 on the side of the fixed optical section 200) may be disposed for the purpose of the phase compensation. When the deviation of the optical path on the side of the movable optical section 190 by the inclination of the phase plate is within an allowable range, only one phase plate may be disposed.

In the embodiment described herein, since two phase plates 500, 510 are disposed, by setting these inclination directions to the opposite directions, the optical path deviation in the movable optical section 190 can be minimized. Additionally, the first phase plate 500 can bear the compensation of the phase deviation between both P, S polarized components by the optical components constituting the fixed optical section 200, and the second phase plate 510 can bear the compensation of the phase deviation by the optical components constituting the fixed optical section 200. The first and second polarized beam splitters 206, 208 are disposed in the fixed optical section 200 as the optical components which possibly cause phase deviations, and the reflective mirror 193 is disposed in the movable optical section 190 as the optical component which possibly causes the phase deviation. In this manner, the fixed and movable optical sections 200 and 190 are provided with the phase plates 500, 510, the phase compensation is performed by the fixed optical section 200 as a module unit, and the phase compensation is performed by the movable optical section 190 as another module unit. Therefore, when the optical storage apparatus is assembled with one arbitrary section out of a large number of fixed optical sections 200 and one arbitrary section out of a large number of movable optical sections 190 in the assembling process, the process of adjusting the phase deviation after the assembly can be omitted.

Figure 15:
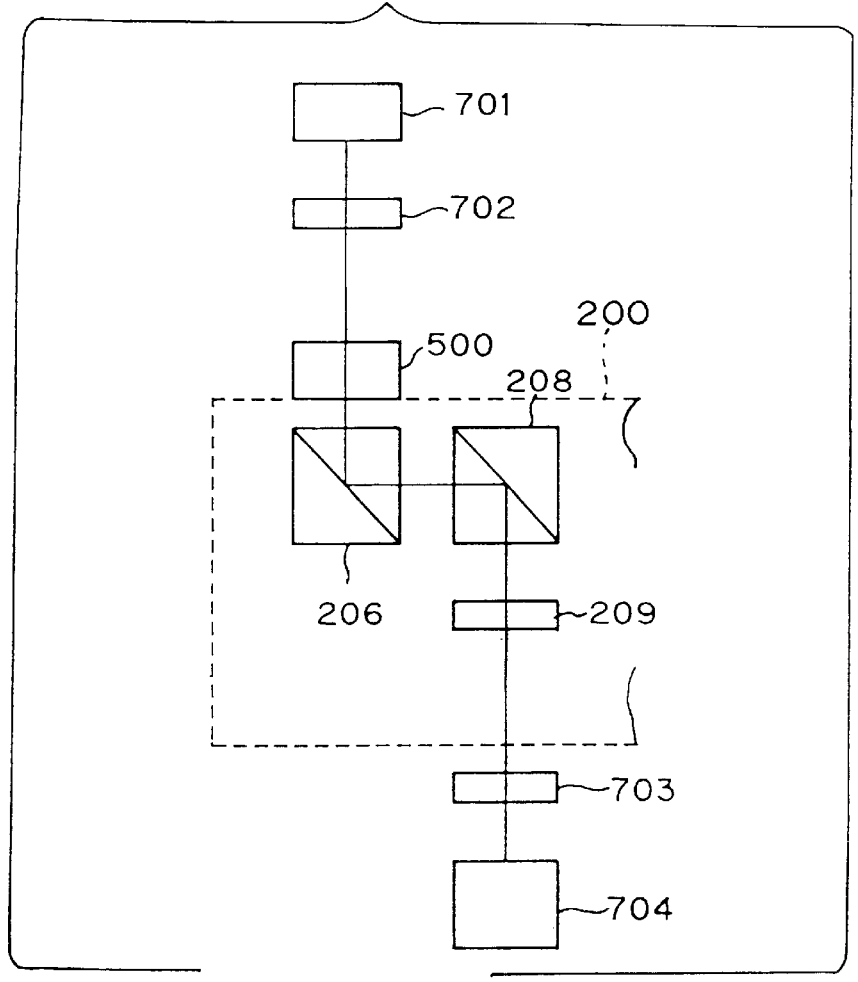
FIG. 15 is a diagram showing a method of adjusting the phase deviation of only the fixed optical section.

FIG. 15 is a diagram showing a method of adjusting the phase deviation of only the fixed optical section 200.

Here, an adjusting semiconductor laser 701, two polarizing plates 702, 703, and adjusting light receiving element 704 are prepared, and arranged as shown in FIG. 15.

The laser beam (P polarized light) emitted from the adjusting semiconductor laser 701 is converted to the laser beam having the P, S polarized components by the polarizing plate 702, transmitted through the phase plate 500, and first and second polarized beam splitter 206, 208, further split to both P, S polarized components by the Wollaston prism 209, and then passed through the polarizing plate 703. Subsequently, by monitoring the light amount ratio of both P, S polarized components by the adjusting light receiving element 704, the inclination of the phase plate 500 is adjusted by the phase compensation mechanism shown in FIG. 13. In this case, the phase deviation in the fixed optical section 200 can be compensated.

Figure 16A:
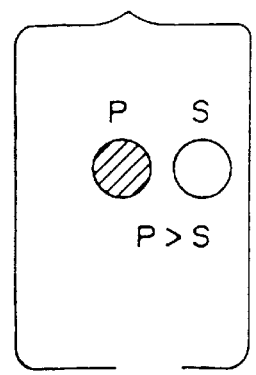
FIGS. 16A, 16B, 16C are schematic views showing the light amount changes of both P, S polarized components received by an adjusting light receiving element.
Figure 16B:
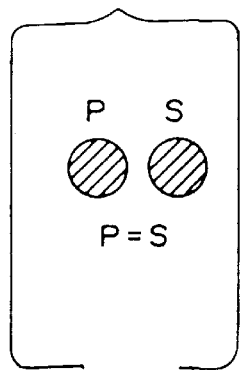
Figure 16C:
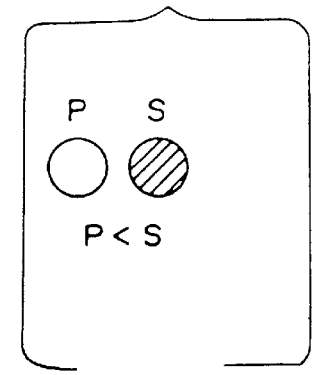

FIGS. 16A, 16B, 16C are schematic views showing the light amount changes of both P, S polarized components of the light received by the adjusting light receiving element 704 of FIG. 15.

In the optical system shown in FIG. 15, when there is a phase difference between both P, S polarized components, the light amounts of both P, S polarized components are unbalanced as shown in FIGS. 16A and 16C.

By adjusting the inclination angle of the phase plate 500 so that the light amounts of both P, S polarized components are set to be the same (see FIG. 16B), the phase difference can be adjusted to provide zero. Additionally, it has been described herein that when the phase difference is zero, the light amounts of both components become the same. However, this is only one example, and the light amount balance at the phase difference of zero can be adjusted in any way by adjusting the polarizing plate 703. For example, the polarizing plate 703 can be adjusted so that the phase difference is zero when the light amount of the P polarized light reaches its maximum and the light amount of the S polarized light reaches its minimum.

Here, the adjustment of the fixed optical section 200 has been described, but the movable optical section 190 can similarly be adjusted. However, since the movable optical section 190 is not provided with the Wollaston prism for separating both P, S polarized components, an adjusting Wollaston prism needs to be prepared as an adjusting jig in addition to the adjusting semiconductor laser and adjusting light receiving element.

Alternatively, the fixed optical section already subjected to the adjustment may be used as the adjusting jig to perform the adjustment on the combination of the movable and fixed optical sections. Alternatively, when the adjustment is allowed after the assembly of the optical storage apparatus, the method of using the above-described reference optical disk, and the like may be used after the assembly to perform the adjustment on the movable optical section 190 (the inclination adjustment of the second phase plate 510).

In the above-described embodiment, the phase plate is disposed in the common optical path formed by overlapping the forward path along which the laser beam advances toward the optical disk and the backward path along which the laser beam reflected by the optical disk returns, but the phase plate does not have to be necessarily disposed in the common optical path. The optical system may be assembled by disposing the phase plate in the part of the backward path different from the forward path so that the light is transmitted through the phase plate by reciprocation. By transmitting the reciprocating light through the phase plate, even when the inclination of the phase plate with respect to the optical axis is changed, the optical path of the transmitted reciprocating light can be maintained to be constant.

Additionally, when the common optical path of the forward and backward paths is provided with the phase plate as described above in the embodiment, the assembling of a special optical system for disposing the phase plate is preferably unnecessary. Furthermore, by disposing the phase plate in the position held between the fixed optical section and the movable optical section as in the above-described embodiment, a favorable effect can be obtained in the miniaturization.

Additionally, in the above-described embodiment, only the regeneration of the information from the optical disk has been described, but the present invention is applied not only to the optical storage apparatus only for reading, but also to the optical storage apparatus which performs both the writing and reading.

As described above, according to the present invention, when the phase deviation between both P, S polarized components is compensated by adjusting the inclination angle of the phase plate, the adjustment of the inclination angle of the phase plate is facilitated, a minute adjustment can be performed, and the optical storage apparatus is also advantageous in respect of cost.

Therefore, according to the present invention, an optical storage apparatus can be realized in which the surge of the DC component of the regenerating signal can be suppressed to a low level and the information can be read at low costs with high reliability.

What is claimed is:

1. An optical storage apparatus in which by radiating light to a storage medium with information stored therein and receiving the light subjected to a polarized state change by reflection in the storage medium, the information stored in the storage medium is read based on the polarized state change, the optical storage apparatus comprising:

a light source for emitting the light to be radiated to said storage medium;

a light receiving element for receiving the light reflected by said storage medium;

a forward path optical system for guiding the light emitted from said light source to said storage medium via a predetermined forward path;

a backward path optical system for guiding the light reflected by said storage medium to the light receiving element via a backward path which traces said forward path in a reverse direction midway after reflection by the storage medium, leaves said forward path midway and reaches said light receiving element, wherein an optical system formed by combining said forward path optical system and said backward path optical system is separately constituted of a fixed optical section fixed to a predetermined base and including said light source and said light receiving element, and a movable optical section moving with respect to said base in accordance with the access position of said storage medium and including only the optical path common to said forward path and said backward path, and a phase plate, disposed on an optical path common to said forward path and said backward path, for compensating for a phase deviation between both P, S polarized components of the light tracing said backward path, said phase plate is disposed on the portion of fixed optical section via which the light is emitted to said movable optical section from the fixed optical section and upon which the light emitted to the fixed optical section from said movable optical section is incident.

2. The optical storage apparatus according to claim 1 wherein said phase plate is disposed in said fixed optical section, and a second phase plate for compensating for the phase deviation between both P, S polarized components of the light tracing said backward path is disposed in the portion of said movable optical section upon which the light emitted to the movable optical section from said fixed optical section is incident and via which the light is emitted to said fixed optical section from the movable optical section.

3. The optical storage apparatus according to claim 2 wherein said phase plate disposed in said fixed optical section and said second phase plate disposed in said movable optical section are disposed in inclined states in opposite directions to each other with respect to the optical axis.

4. A phase compensation amount adjustment method for an optical storage apparatus in which by radiating light to a storage medium with information stored therein and receiving the light subjected to a polarized state change by reflection by the storage medium, the information stored in the storage medium is read based on the polarized state change and which comprises: a light source for emitting the light to be radiated to said storage medium; a light receiving element for receiving the light reflected by said storage medium; a forward path optical system for guiding the light emitted from said light source to said storage medium via a predetermined forward path; a backward path optical system for guiding the light reflected by said storage medium to the light receiving element via a backward path which traces said forward path in a reverse direction midway after the reflection by the storage medium, leaves said forward path midway and reaches said light receiving element; and a phase plate, disposed on an optical path common to said forward path and said backward path, for compensating for a phase deviation between both P, S polarized components of the light tracing said backward path, the method of adjusting a phase compensation amount by said phase plate in the optical storage apparatus comprising the steps of:

using a predetermined reference storage medium as said storage medium; monitoring a signal obtained by said light receiving element; and adjusting the inclination angle of said phase plate to the optical axis to minimize the phase deviation between both P, S polarized components of the light tracing said backward path.

5. A phase compensation amount adjustment method for an optical storage apparatus in which by radiating light to a storage medium with information stored therein and receiving the light subjected to a polarized state change by reflection by the storage medium, the information stored in the storage medium is read based on the polarized state change and which comprises: a light source for emitting the light to be radiated to said storage medium; a light receiving element for receiving the light reflected by said storage medium; a forward path optical system for guiding the light emitted from said light source to said storage medium via a predetermined forward path; a backward path optical system for guiding the light reflected by said storage medium to the light receiving element via a backward path which traces said forward path in a reverse direction midway after the reflection by the storage medium, leaves said forward path midway and reaches said light receiving element; and a phase plate, disposed on an optical path common to said forward path and said backward path, for compensating for a phase deviation between both P, S polarized components of the light tracing said backward path, the method of adjusting a phase compensation amount by said phase plate in the optical storage apparatus comprising the steps of:

preparing an adjusting light source for emitting a light imitating the light reflected by said storage medium instead of said light source and said storage medium and preparing an adjusting light receiving element instead of said light receiving element; receiving the imitating light emitted from said adjusting light source by said adjusting light receiving element via at least a part of said backward path including said phase plate; monitoring a signal obtained by the adjusting light receiving element; and adjusting the inclination angle of said phase plate to the optical axis to minimize the phase deviation between both P, S polarized components of said imitating light.

\* \* \* \* \*